United States Patent [19]

Steinbruegge et al.

[11] 4,436,363
[45] Mar. 13, 1984

[54] BROADBAND ANTIREFLECTION COATING FOR INFRARED TRANSMISSIVE MATERIALS

[75] Inventors: Kenneth B. Steinbruegge; Johanna S. Schruben; Lyle H. Taylor, all of Murrysville, Pa.

[73] Assignee: Westinghouse Electric Corp., Pittsburgh, Pa.

[21] Appl. No.: 405,825

[22] Filed: Aug. 6, 1982

[51] Int. Cl.³ .............................................. G02B 5/28
[52] U.S. Cl. ...................................... 350/1.6; 350/166
[58] Field of Search ................. 350/1.6, 164, 165, 166

[56] References Cited

U.S. PATENT DOCUMENTS 2,858,240 10/1958 Turner et al. ...................... 350/166
3,792,287 2/1974 Roland et al. ...................... 350/406

Primary Examiner—Bruce Y. Arnold
Assistant Examiner—William Propp
Attorney, Agent, or Firm—T. R. Trempus

[57] ABSTRACT

A broadband antireflection multilayer coating for infrared transmissive materials comprises a first thin film layer selected from the group consisting of zinc-selenide and zinc-sulfide, a second thin film layer selected from the group consisting of lead-fluoride and aluminum oxide and a third thin film layer selected from the group consisting of magnesium-fluoride, barium-fluoride and calcium-fluoride. This antireflection coating is particularly useful with acousto-optic tunable filter systems, wire grid polarizers and infrared frequency doublers.

16 Claims, 7 Drawing Figures

BROADBAND ANTIREFLECTION COATING FOR INFRARED TRANSMISSIVE MATERIALS

BACKGROUND OF THE INVENTION

The invention is directed to multilayer thin film coatings which can substantially reduce the surface reflectivity of materials, particularly materials with a high index of refraction, over a broad range in the infrared spectrum.

Infrared transmitting optical materials are finding wide application in various laser, pyrometer and analyzer systems. The infrared spectral range with wavelengths between approximately 1.7 μm and 10.0 μm is particularly useful for analyzer applications because nearly all organic materials and products of combination demonstrate unique infrared absorption bands in this wavelength interval. One such analyzer system utilizes an acousto-optic tunable filter which operates through the interaction of high frequency acoustic waves with light waves in a suitable crystal. Infrared acousto-optic tunable filters can have a light transmission loss of more than 50 percent at the crystal's surface due to the high index of refraction of the crystal. The transmission loss reduces the detector signal-to-noise ratio achievable in acousto-optic systems. The use of additional transmitting components, such as polarizers, which are often required in infrared analyzer systems, contributes additional surface reflection with resulting transmission loss.

It is an object of this invention to provide a multilayer thin film antireflection coating which substantially reduces the surface reflectivity of infrared transmitting materials, particularly materials with a high index of refraction.

It is also an object of this invention to provide an infrared transmissive device having significantly improved transmission characteristics due to reduced surface reflectivity.

It is still another object of this invention to provide a wire grid polarizer adapted for use with an infrared transmissive device. The wire grid polarizer includes a multilayer thin film antireflection coating which improves the polarizer's infrared transmission characteristics.

SUMMARY OF THE INVENTION

A broadband antireflection coating particularly suited for use with infrared transmissive materials consists of three film layers successively superimposed on the transmissive material. The first layer is a compound selected from the group consisting of zinc-selenide (ZnSe) and zinc-sulfide (ZnS); the second layer is a compound selected from the group consisting of lead-fluoride (PbF$_2$) and aluminum oxide (Al$_2$O$_3$); and the third layer is a compound selected from the group consisting of magnesium-fluoride (MgF$_2$), barium-fluoride (BaF$_2$) and calcium-fluoride (CaF$_2$). Additionally, an infrared transmissive device with a multilayer antireflection and a wire grid polarizer having an infrared transmissive substrate are both provided with the aforedescribed antireflection coating.

BRIEF DESCRIPTION OF THE DRAWINGS

The above as well as other features and advantages of this invention will become apparent through consideration of the detailed description in connection with the accompanying drawings in which.

DETAILED DESCRIPTION OF THE PREFERRED EMBODIMENTS

Figure 1:
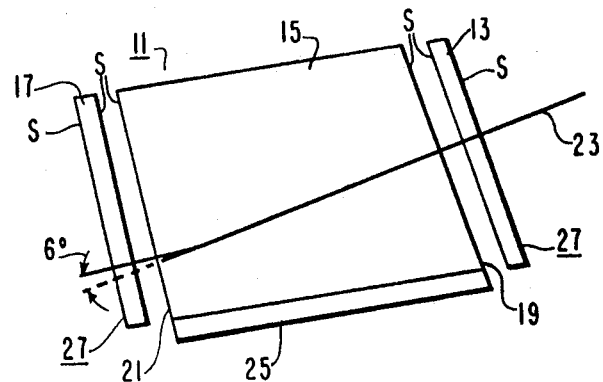
FIG. 1 is a somewhat schematical representation of an acousto-optic tunable filter.

The broadband antireflection coating of this invention is particularly useful in acousto-optic applications. Accordingly, the invention is described in combination with an acousto-optic tunable filter. Such a description should not be construed to limit the antireflection coating to such a use, for the present coating lends itself to use in broadband applications in the infrared spectrum.

An acousto-optic tunable filter 11 comprises an input polarizer 13, an acousto-optic crystal 15 and an output polarizer 17. The acousto-optic crystal is preferably a rhombohedral crystal with at least two polished opposing faces 19 and 21. The crystal is a thallium-arsenic-selenide (Tl$_3$AsSe$_3$) crystal which is taught in U.S. Pat. No. 3,792,287 which is assigned to the assignee of the subject application and is incorporated herein by reference. The input optical face 19 of the crystal 15 is oriented so as to be normal to the incident infrared beam 23. The output of the infrared beam is defracted at an angle of about 6 degrees to the incident beam and the exit optical face 21 is fabricated so as to be normal to the defracted beam. An acoustic transducer 25 is mated to a side surface of the crystal 15 and typically consists of an x-cut lithium niobate crystal plate attached to the crystal 15 with an indium metal bond. A conductive electrode pattern is provided on both sides of the lithium niobate transducer.

Figure 2:
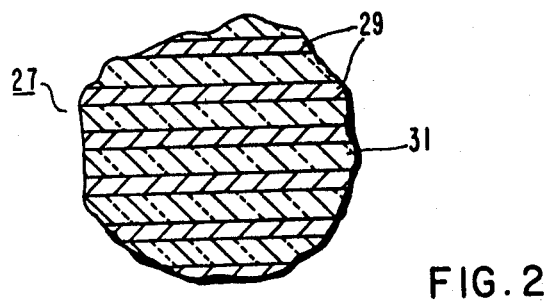
FIG. 2 is a greatly enlarged representation of a wire grid polarizer.

Considering both FIGS. 1 and 2, the input polarizer 13 and the output polarizer 17 both comprise what are termed wire grid polarizers 27. Each polarizer 27 consists of a plurality of parallel, closely spaced conductors 29 provided upon a radiation transmissive substrate 31, with the spacing between adjacent conductors 29 being less than the wavelength of transmitted radiation. One example of a wire grid polarizer having a plurality of conductors on an infrared transmissive silicon substrate is taught in U.S. patent application Ser. No. 413,594 which is assigned to the assignee herein and incorporated by reference.

An acousto-optic tunable filter as described above can have a transmission of less than 50 percent due to the high reflectivity of its surfaces. This is due to an index of refraction in Tl$_3$AsSe$_3$ crystals of 3.38 and a resulting reflectivity of approximately 29.5 percent per surface. This high surface reflectivity reduces the signal throughput and thus the signal-to-noise ratio achievable in analyzer systems using these crystals. Additional infrared transmissive components, such as the wire grid polarizer described above, are often required in the acousto-optic system. Because wire grid polarizers are sometimes formed on a substrate with a high index of refraction, a large transmission loss in these optical components is common.

In the configuration of the acousto-optic system described in association with FIG. 1, the transmitted optical signal, limited only by the surface reflectivities of the crystal surfaces 19 and 21, and the polarizers 13 and 17 (a total of six surfaces), will be reduced to approximately 12 percent of its original level.

The broadband antireflection coating of this invention is a three layer thin film coating which significantly reduces the surface reflectivity of high index of refraction infrared materials. More particularly, this coating is extremely effective in reducing surface reflectivity in materials with an index of refraction of approximately 3.4±0.1 and for the infrared wavelength range of 1.7 μm to 10.0 μm.

Figure 3:
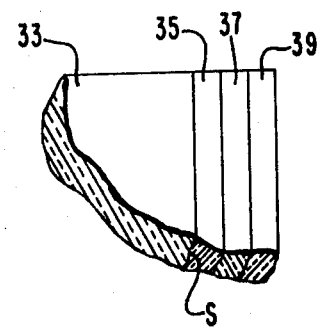
FIG. 3 is an enlarged representation of a section through an infrared transmissive material with a multilayer thin film antireflection coating disposed thereon.

As shown in FIG. 3, the antireflection coating is applied to the surface "S" of an infrared transmissive substrate 33. The antireflection coating comprises a first thin film layer 35, a second thin film layer 37 and a third thin film layer 39. The three coatings can be applied to the substrate by vacuum deposition or any other satisfactory method of thin film application known in the art. The surface "S" of the substrate 33 correspondis to the surfaces "S" of the crystal 15 and the polarizers 27.

The first thin film layer 35 is a compound selected from the group consisting of zinc-selenide (ZnSe) and zinc-sulfide (ZnS) which is disposed on the transmissive material 33. The second thin film layer 37 is a compound selected from the group consisting of lead-fluoride (PbF$_2$) and aluminum oxide (Al$_2$O$_3$) and disposed on the first layer 35. The third thin film layer 39, which is disposed on the second layer 37, is a compound selected from the group consisting of magnesium-fluoride (MgF$_2$), barium-fluoride (BaF$_2$) and calcium-fluoride (CaF$_2$).

Figure 4:
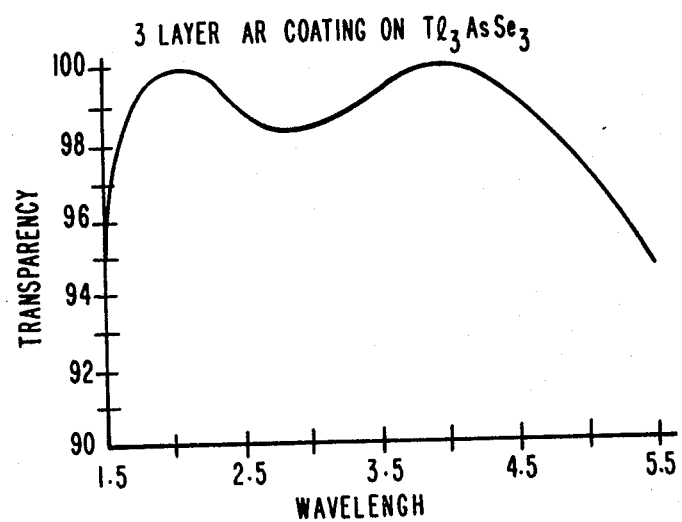
FIG. 4 is a graph showing the transmission versus wavelength characteristics of the antireflection coating according to one embodiment of the present invention, when applied to an acousto-optic crystal.

A first embodiment of the invention is set forth in Table I below and graphically represented by FIG. 4 which shows a transmission versus wavelength graph for a three layer antireflection coating deposited onto a Tl$_3$AsSe$_3$ crystal. In the several embodiments described herein, the transmission values have been calculated by computer and assume light perpendicular to a flat surface. It should be noted that variations in the thickness of each layer of approximately 3 percent do not significantly affect the coating's performance. Additionally, light incident at angles up to about 10° does not significantly affect the coating's performance. The index of refraction for each layer has been experimentally determined from evaporated thin films.

TABLE I

| | Material | Thickness (μm) | Index of Refraction |
|---|---|---|---|
| First Layer | ZnSe | 0.2302 | 2.584 |
| Second Layer | PbF$_2$ | 0.3654 | 1.788 |

TABLE I-continued

| | Material | Thickness (μm) | Index of Refraction |
|---|---|---|---|
| Third Layer | CaF$_2$ | 0.3963 | 1.290 |

The multilayer coating consisting of ZnSe, PbFe$_2$ and CaF$_2$ provides a significant transmission improvement to the crystal. This coating can also be applied to the infrared transmissive substrate of a wire grid polarizer to effect improved light transmission over a broad wavelength interval of between about 1.5 μm and 5.5 μm.

Figure 5:
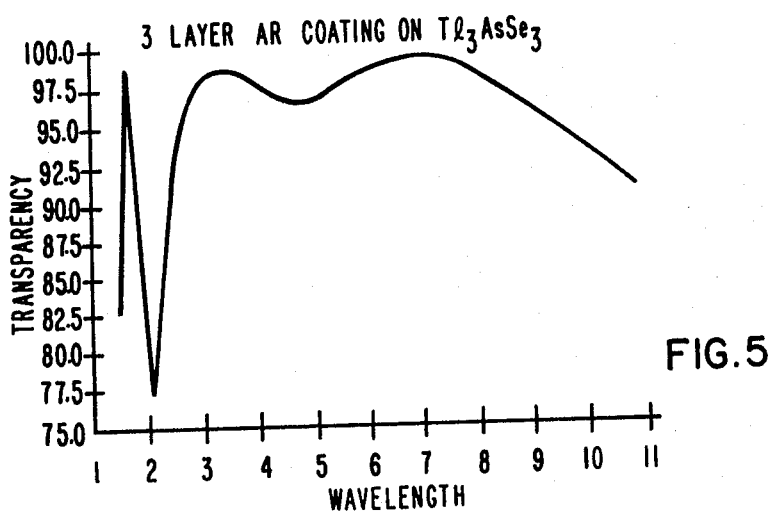
FIG. 5 is a graph showing the transmission versus wavelength characteristics of the antireflection coating according to an alternative embodiment of this invention, when applied to an acousto-optic crystal.
Figure 6:
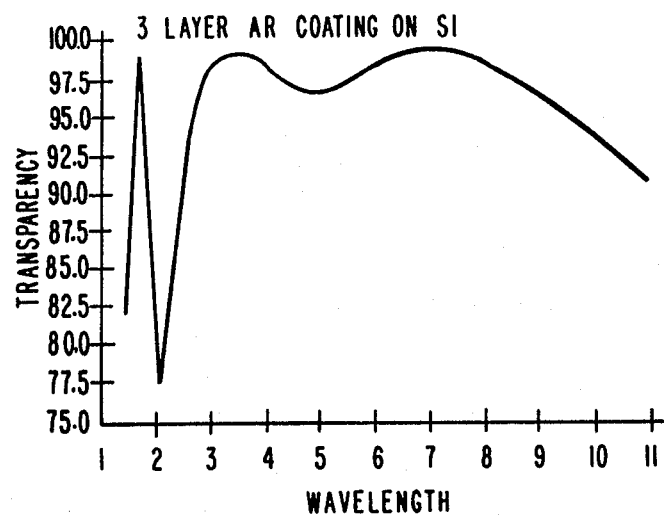
FIG. 6 is a graph showing the transmission versus wavelength characteristics of the antireflection coating according to the alternative embodiment of this invention when applied to an infrared transmissive silicon crystal substrate.

An alternative embodiment of this multilayer antireflection coating is set forth in Table II and the transmission versus wavelength graph in both FIGS. 5 and 6.

TABLE II

| | Material | Thickness (μm) | Index of Refraction |
|---|---|---|---|
| First Layer | ZnSe | 0.380 | 2.584 |
| Second Layer | PbF$_2$ | 0.735 | 1.788 |
| Third Layer | CaF$_2$ | 0.649 | 1.290 |

The reflectivity versus wavelength plot of FIG. 5 presents the excellent antireflection qualities obtained when a coating as set forth in Table II is applied to a Tl$_3$AsSe$_3$ crystal. For infrared wavelengths between about 1.7 and 10.0 μm, a surface transmission rate of approximately 95 percent or better is achieved. Similarly, the reflectivity versus wavelength plot of FIG. 6 illustrates the high percentage of infrared transmission obtained when the antireflection coating in Table II is applied to a silicon substrate. Even though the index of refraction of a Tl$_3$AsSe$_3$ crystal is about 3.38 and that of a silicon crystal substrate (Si) is about 3.49, the surface transmission obtained through the use of the antireflection coating of this invention is nearly the same, within about 0.5 percent, over the range of interest.

Figure 7:
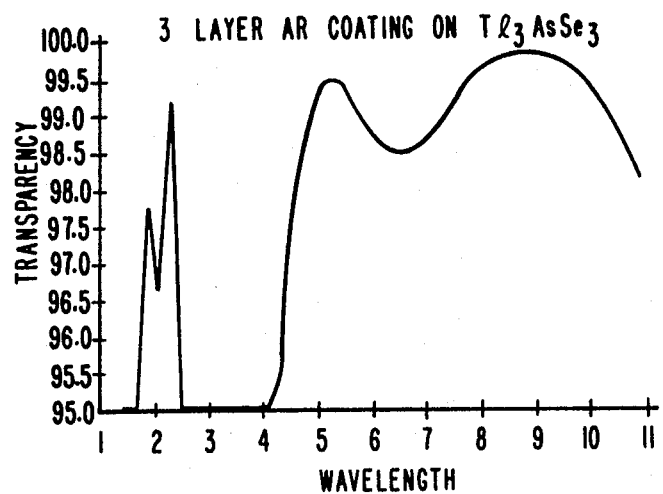
FIG. 7 is a graph showing the transmission versus wavelength characteristics of the antireflection coating according to an alternative embodiment of this invention which minimizes the surface reflectivity of an acousto-optic crystal at approximately 5 μm and 10 μm.

Another embodiment of the multilayer antireflection coating is set forth in the transmission versus graph of FIG. 7 and in the data of Table III. The antireflection coating of this embodiment provides excellent transmissive qualities at wavelengths of approximately 5 μm and 10 μm and can be used on crystal devices configured as frequency doubling devices.

TABLE III

| | Material | Thickness (μm) | Index of Refraction |
|---|---|---|---|
| First Layer | ZnSe | .601 | 2.584 |
| Second Layer | PbF$_2$ | .918 | 1.788 |
| Third Layer | CaF$_2$ | .707 | 1.290 |

In addition to providing a significant transmission improvement to high index of refraction surfaces over a broad wavelength interval, this coating has been specially optimized to provide the highest throughput at infrared wavelengths corresponding to absorption bands of common organic materials and combustion products. At wavelengths corresponding to absorptions by common oxides of nitrogen, sulfur and carbon, for example, the transmission of the coated surface generally exceeds 97 percent.

What has been described is an antireflection coating particularly useful with high index of refraction infrared transmitting materials. This antireflection coating is ideal for use with acousto-optic tunable filter components such as Tl₃AsSe₃ crystal filters, frequency doublers and silicon crystal substrate wire grid polarizers.

What is claimed is:

1. A broadband antireflection coating for use on infrared transmissive materials comprising:
   a first thin layer, of a compound selected from the group consisting of zinc-selenide (ZnSe) and zinc-sulfide (ZnS), disposed on the transmissive material;
   a second thin layer, of a compound selected from the group consisting of lead-fluoride (PbF₂) and aluminum oxide (Al₂O₃), disposed on said first layer; and
   a third thin layer of a compound, selected from the group consisting of magnesium-fluoride (MgF₂), barium-fluoride (BaF₂) and calcium-fluoride (CaF₂), disposed on said second layer.

2. The broadband antireflection coating of claim 1 wherein the first thin film layer is zinc-selenide (ZnSe): the second thin film layer is lead-fluoride (PbF₂); and the third thin film layer is calcium-fluoride (CaF₂).

3. The broadband antireflection coating of claim 2 wherein the first thin film layer is approximately 0.230 μm in thickness; the second thin film layer is approximately 0.365 μm in thickness; and the third thin film layer is approximately 0.396 μm in thickness.

4. The broadband antireflection coating of claim 1 wherein the first thin film layer is zinc-selenide (ZnSe); the second thin film layer is lead-fluoride (PbF₂); and the third thin film layer is magnesium-fluoride (MgF₂).

5. The broadband antireflection coating of claim 1 wherein the infrared trasmissive material is a crystal with the formula Tl₃AsSe₃.

6. An infrared transmissive device comprising a rhombohedial crystal having the formula Tl₃AsSe₃ and including at least two polished opposing faces, in combination with a multilayer thin film antireflection coating disposed on at least the aforesaid two opposing faces, said multilayer thin film coating consisting of a first thin film layer, of a compound selected from the group consisting of zinc-selenide (ZnSe) and zinc-sulfide (ZnS), disposed on said faces; a second thin film layer, of a compound selected from the group consisting of lead-fluoride (PbF₂) and aluminum oxide (Al₂O₃), disposed on said first layer; and a third thin film layer, of a compound selected from the group consisting of magnesium-fluoride (MgF₂), barium-fluoride (BaF₂) and calcium-fluoride (CaF₂), disposed on said second layer.

7. The infrared transmissive device according to claim 6 wherein the antireflection coating comprises a first thin film layer of zinc-selenide (ZnSe), a second thin film layer of lead-fluoride (PbF₂), and a third thin film layer of magnesium-fluoride (MgF₂).

8. The infrared transmissive device according to claim 6 wherein the antireflection coating comprises a first thin film layer of zinc-selenide (ZnSe), a second thin film layer of lead-fluoride (PbF₂) and a third thin film layer of calcium-fluoride (CaF₂).

9. The infrared transmissive device according to claim 8 wherein the first thin film layer of the antireflection coating has a thickness of approximately 0.380 μm, the second thin film layer has a thickness of approximately 0.735 μm; and the third thin film layer has a thickness of approximately 0.640 μm.

10. In combination with a wire grid polarizer having an infrared transmitting substrate, a multilayer thin film antireflection coating disposed on said substrate, said antireflection coating comprising a first thin film layer of a compound, selected from the group consisting of zinc-selenide (ZnSe) and zinc-sulfide (ZnS), disposed on said substrate, a second thin film layer, of a compound selected from the group consisting of lead-fluoride (PbF₂) and aluminum oxide (Al₂O₃), disposed on said first layer, and a third thin film layer, selected from the group consisting of magnesium-fluoride (MgF₂), barium-fluoride (BaF₂) and calcium-fluoride (CaF₂), disposed on said second layer.

11. The multilayer thin film antireflection coating of claim 10 wherein the first thin film layer is zinc-selenide (ZnSe); the second thin film layer is lead-fluoride (PbF₂); and the third thin film layer is calcium-fluoride (CaF₂).

12. The multilayer thin film antireflection coating of claim 11 wherein the first thin film layer is approximately 0.380 μm in thickness; the second thin film layer is approximately 0.735 μm in thickness; and the third thin film layer is approximately 0.649 μm in thickness.

13. The broadband antireflection coating of claim 10 wherein the first thin film layer is zinc-selenide (ZnSe), the second thin film layer is lead-fluoride (PbF₂), and the third thin film layer is magnesium-fluoride (MgF₂).

14. In combination with a crystal device with two opposing faces configured as a frequency doubler, a multilayer thin film antireflection coating disposed on at least said two opposing faces in order to promote infrared transmission at wavelengths of approximately 5 μm and 10 μm, said multilayer antireflection coating comprising: a first thin film layer, of a compound selected from the group consisting of zinc-selenide (ZnSe) and zinc-sulfide (ZnS), disposed on said faces; a second thin film layer, of a compound selected from the group consisting of lead-fluoride (PbF₂) and aluminum oxide (Al₂O₃), disposed on said first layer; and a third thin film layer, selected from the group consisting of magnesium-fluoride (MgF₂), barium-fluoride (MgF₂), barium-fluoride (BaF₂) and calcium-fluoride (CaF₂), disposed on said second layer.

15. The multilayer thin film antireflection coating of claim 14 wherein the first thin film layer is zinc-selenide (ZnSe); the second thin film layer is lead-fluoride (PbF₂); and the third thin film layer is calcium-fluoride (CaF₂).

16. The multilayer thin film antireflection coating of claim 15 wherein the first thin film layer is approximately 0.601 μm in thickness; the second thin film layer is approximately 0.918 μm in thickness; and the third thin film layer is approximately 0.707 μm in thickness.

* * * * *